United States Patent
Su

(10) Patent No.: US 9,637,617 B2
(45) Date of Patent: May 2, 2017

(54) ENVIRONMENTALLY-FRIENDLY ANTI-CRACKING, ANTI-CORROSIVE AND WATERPROOF MATERIAL AND PREPARATION METHOD THEREFOR

(71) Applicant: Zebin Su, Sichuan (CN)

(72) Inventor: Zebin Su, Sichuan (CN)

(*) Notice: Subject to any disclaimer, the term of this patent is extended or adjusted under 35 U.S.C. 154(b) by 0 days.

(21) Appl. No.: 14/442,057

(22) PCT Filed: Sep. 3, 2014

(86) PCT No.: PCT/CN2014/000822
§ 371 (c)(1),
(2) Date: May 11, 2015

(87) PCT Pub. No.: WO2015/058463
PCT Pub. Date: Apr. 30, 2015

(65) Prior Publication Data
US 2015/0284545 A1 Oct. 8, 2015

(30) Foreign Application Priority Data
Oct. 25, 2013 (CN) .......................... 2013 1 0511451

(51) Int. Cl.
| | | |
|---|---|---|
| C08L 1/02 | (2006.01) | |
| C08L 1/28 | (2006.01) | |
| C08L 67/00 | (2006.01) | |
| C09D 129/14 | (2006.01) | |
| C08L 1/12 | (2006.01) | |
| C08L 23/08 | (2006.01) | |
| C08L 29/14 | (2006.01) | |
| C08L 67/02 | (2006.01) | |
| C08L 71/00 | (2006.01) | |
| C09K 3/18 | (2006.01) | |
| C08K 3/30 | (2006.01) | |

(52) U.S. Cl.
CPC ................. *C08L 1/286* (2013.01); *C08L 1/12* (2013.01); *C08L 23/0869* (2013.01); *C08L 29/14* (2013.01); *C08L 67/00* (2013.01); *C08L 67/02* (2013.01); *C08L 71/00* (2013.01); *C09D 129/14* (2013.01); *C09K 3/18* (2013.01); *C08K 2003/3045* (2013.01); *C08L 2205/02* (2013.01); *C08L 2205/03* (2013.01); *C08L 2205/16* (2013.01)

(58) Field of Classification Search
CPC ...... C08L 1/00; C08L 1/12; C08L 1/26; C08L 1/286; C08L 67/00; C08L 67/02; C08L 2205/16; C08L 29/14; C08L 71/00; C08K 3/30; C08K 13/04; C08K 2003/3045; C08K 7/08; C09K 3/18; C09D 167/00–167/08
See application file for complete search history.

(56) References Cited

U.S. PATENT DOCUMENTS 6,008,291 A * 12/1999 Weinberger ............ C08J 3/2053
428/480
2011/0171481 A1* 7/2011 Kainz .................... B32B 15/08
428/480

* cited by examiner

*Primary Examiner* — Satya Sastri

(57) ABSTRACT

Disclosed are an environmentally-friendly anti-cracking, anti-corrosive and waterproof material and a preparation method therefor, which may solve the following problems of the existing waterproof and anti-corrosive materials: a single function, a poor property, a high cost and a short service life. The waterproof material in the present invention consists of the following components in weight parts: 5-15 parts of synthetic polyester resin, 3-6 parts of penetrant, 1-3 parts of cellulose fiber, 0.1-0.3 parts of cellulose ether, 75-85 parts of solvent. A preparation method of the above waterproof material is also provided. The formulation used in the present invention can have the effects of efficiently protecting indoors and outside, and be used for penetration resistant, waterproof, moisture proof, mildew proof, anti-corrosive, acid and alkali resistant, oil leaking resistant, corrosion resistant, freezing and thawing resistant, anti-cracking, weather and aging resistant, and fouling resistant penetration-type waterproof, anti-corrosive indoors and outside corrosion resistant engineering.

19 Claims, No Drawings

ENVIRONMENTALLY-FRIENDLY
ANTI-CRACKING, ANTI-CORROSIVE AND
WATERPROOF MATERIAL AND
PREPARATION METHOD THEREFOR

CROSS REFERENCE OF RELATED
APPLICATION

This is a U.S. National Stage under 35 U.S.C 371 of the International Application PCT/CN2014/000822, filed Sep. 3, 2014, which claims priority under 35 U.S.C. 119(a-d) to CN 201310511451.7, filed Oct. 25, 2013.

BACKGROUND OF THE PRESENT
INVENTION

Technical Field

The invention relates to an anti-cracking, anti-corrosive and waterproof material, more specifically, to an environmentally-friendly anti-cracking, anti-corrosive and waterproof material and preparation method therefor.

Background Art

An anti-cracking, waterproof and anti-corrosive material is widely used for modern architecture. The anti-cracking, waterproof and anti-corrosive material is required to use for all construction engineering to improve the durability and service life of the construction engineering. Our country is a production and sales power of cement in the world, has 30%-40% of the whole production and sales, has giant engineering infrastructure, and provides a great market for anti-cracking, waterproof and anti-corrosive material. Nevertheless, for conventional anti-cracking, waterproof and anti-corrosive materials, a rigid anti-cracking, waterproof and anti-corrosive material is achieved by adding inorganic waterproof agent, anti-corrosive agent, anti-cracking fibre, anti-cracking sweller, hydrophobic agent, water reducer, air entraining agent, anti-freeze agent and the like to cement concrete and mortar, thereby forming a rigid anti-cracking, waterproof and anti-corrosive cement concrete layer; further, various anti-cracking, waterproof and anti-corrosive coating are applied to the surface of the cement concrete, and various anti-cracking, waterproof and anti-corrosive coined materials are bond to it. These anti-cracking, waterproof and anti-corrosive materials need a great deal of high consumed and polluted mineral resource and energy, non-renewable petroleum resource, coal, electricity and gas resource, and result in the environmental pollution.

During hundreds of years of development from conventional products to modern products, a waterproof and anti-corrosive material has played a good role to prolong service life of construction engineering. However, it is not convenient to use and has no good efficiency, and consume great resource and increase protective cost. The reason is in that: the rigid waterproof and anti-corrosive material has good durability, but tends to crack and deform; porous structure can not be filled by 5-10% of rigid materials, and quite a number of capillary channels occur to leak out; for coined materials and coating of outdoor protective materials, the durability is merely 3-5 years, and the material can not be chemically reacted with the porous structural inorganic material to form integral waterproof structure, which is only a bonding mode to temporarily joint, thereby achieving short-time waterproof property. With the gradual development of oxidization, cooling and heating, freezing and thawing, corrosion factors, the waterproof and anti-corrosive property will rapidly lose. Therefore, with the demand of modern building development and the social demand of energy conservation and environment protection, low-carbon, resource conservation, an anti-cracking, waterproof, an anti-corrosive and durable material has become an important research subject of waterproof and anti-corrosive field in the world.

CONTENTS OF THE INVENTION

The object of the invention is to provide an environmentally-friendly anti-cracking, anti-corrosive and waterproof material and preparation method therefor. The material can ensure an anti-corrosive and waterproof property of structures, and further satisfy various anti-corrosive and waterproof functions and requirements of which, wherein the requirements are simple construction, saving labor, saving times, saving money, safety, health, green and environmentally-friendly. As compared to the current products on the market, the anti-corrosive and waterproof material in the present invent is better, and has more wide application, more energy saving and environmental protection.

The invention can be achieved by the following technical solution.

An environmentally-friendly anti-cracking, anti-corrosive and waterproof material, wherein the waterproof material consists of the following components in weight parts:

| | |
|---|---|
| synthetic polyester resin | 5-15 parts |
| penetrant | 3-6 parts |
| cellulose fibre | 1-3 parts |
| cellulose ether | 0.1-0.3 parts |
| solvent | 75-85 parts. |

The anti-cracking, anti-corrosive and waterproof material preferably consists of the following components in weight parts: 15 parts of synthetic polyester resin, 3 parts of penetrant, 2 parts of cellulose fibre, 0.2 parts of cellulose ether, and 79.8 parts of solvent.

In another embodiment, the waterproof material consists of the following components in weight parts: 15 parts of synthetic polyester resin, 5 parts of penetrant, 3 parts of cellulose fibre, 0.1 parts of cellulose ether, and 76.9 parts of solvent.

In another embodiment, the waterproof material consists of the following components in weight parts: 15 parts of synthetic polyester resin, 6 parts of penetrant, 3 parts of cellulose fibre, 0.15 parts of cellulose ether, and 75.85 parts of solvent.

Further, the synthetic polyester resin is selected from one or more of the group consisting of polyester (polyethylene terephthalate), polyvinyl butyral, phenolic resin polyethylene, ethylene-ethyl acrylate copolymer, polyisobutylene and polyvinyl fluoride. The important function of the synthetic polyester resin in the inventive anti-cracking, anti-corrosive and waterproof material is to fill the pores and gaps of the porous structure and form a weathering, durable, anti-corrosive, wearable, waterproof protection film on the surface.

Further, the penetrant is selected from one or more of the group consisting of calcium sulfate whisker, zinc sulfate, zirconium sulfate, lithium sulfate, magnesium sulfate and silicon dioxide. The important function of the penetrant in the inventive anti-cracking, anti-corrosive and waterproof material is to penetrate into porous structure, and the penetrant is reacted with the inorganic ion and organic polymer to obtain crystallized body which may fill void and densify anti-penetration, waterproof and anti-corrosion, block the penetrative passage of the harmful ion (chloridion, acid-base ion). It is an important ingredient of the waterproof, anti-corrosive and durable ion.

Further, the cellulose fibre is selected from one or more of the group consisting of nitrocellulose, cellulose acetate, cellulose acetate butyrate and microcrystalline cellulose. The function of the cellulose fibre in the inventive anti-cracking, anti-corrosive and waterproof material is anti-cracking, waterproof and anti-corrosive. In one aspect, it may penetrate voids and gaps with other components to vertically and horizontally joint and bind in the voids and gaps or on the surface, which can further enhance the waterproof and anti-corrosive property.

Additionally, the cellulose ether is selected from one or more of the group consisting of hydroxypropyl methyl cellulose, hydroxyethyl methyl cellulose, ethyl cellulose and carboxymethyl cellulose. The cellulose ether in the waterproof material in the present invention can improve viscosity and consistency of the liquid, and enhance cohesional strength of adhesive materials. Meanwhile, the improvement of thickening property may decrease delamination of inorganic penetrative ion, and make homogenization be good.

In addition, the solvent is selected from one or more of the group consisting of ethanol, methanol, n-propanol, n-butanol, isobutanol, glycol. The function of solvent in the inventive waterproof material is to dissolve the synthetic polyester resin and inorganic ion, disperse support, and penetrate and spread.

A method for producing an environmentally-friendly anti-cracking, anti-corrosive and waterproof material, includes the following steps:

(1) adding solvent to a sandwich reactor, increasing the temperature to 85-115° C., stirring by a stirrer, adding synthetic polyester resin, dissolving sufficiently and polymerizing for 3-5 hours;

(2) adding penetrant, and polymerizing for 1-3 hours;

(3) adding cellulose fibre and polymerizing for 1-3 hours, then adding cellulose ether, stirring for 30-50 minutes, and cooling to 30-50° C. for obtaining the resultant material.

To recycle waste and decrease production cost, polyester and resin materials, which are discarded and pollute environment at present, such as plastic bottle and film for example PVA, PBB, PVB and the like; and which can be cracked into water molecule with catalyst, are applied to the polyester resin in the present invention. Additionally, the cellulose fibre may be extracted from an agricultural waste straw by a biodegradation and fermentation method. Microcrystal penetrant extracted from industrial waste residue (coal cinder, lithium slag, magnesium slag, zirconium slag) is used as an important material for the waterproof material. The preparation method will not discharge 'three wastes' and will not be toxic and polluted.

The invention has the following advantages and beneficial effects:

(1) The formula used in the invention may effectively impact the inside and outdoor protection, and be used for penetration resistant, waterproof, moisture proof, anti-corrosive, acid and alkali resistant, oil leaking resistant, corrosion resistant, freezing and thawing resistant, anti-cracking, weather and aging resistant, and fouling resistant penetration-type waterproof, anti-corrosive indoors and outside corrosion resistant engineering, for example various water pool, breeding pool, wastewater treatment pool, blow-off line, ditch, swimming pool, kitchen and toilet, tunnel, civil air defense, maritime works, subway, granary, petroleum reserves, high speed railway and road bridge, tunnel, reservoir dam, electric power, factory, and all waterproof and anti-corrosive engineering of industrial and civil building. In particular, it is waterproof, anti-corrosive, weather resistant and anti aging engineering for cement product, wooden product, wood plastic product, culture stone, ground brick, wall brick and marble brick.

(2) After repeated test, it is demonstrated that the waterproof material in the present invention can penetrate the waterproof and anti-corrosive layer for 10-100 nm, and have better waterproof and anti-corrosive effects than the rigid; the waterproof, anti-corrosive, weather resistant and durable property on the surface can be more than 30-50 years (accelerated aging test), have good bonding and anti-cracking property, be 10-20 times markedly better than coiled materials and anti-corrosive coating, improve more than 10 times of working speed; reduce 10-30% of waterproof and anti-corrosive cost compared to conventional materials; have no pollution during the production and use. The resource and energy used for the waterproof in the present invention is less than 20% compared to conventional materials. The present invention has markedly technical, social and economical effects, and is a sustainable evolutionary and sunrise industry.

EMBODIMENT

The invention will be further explained below with reference to examples, but the embodiment will not be limited to this.

Example 1

An environmentally-friendly anti-cracking, anti-corrosive and waterproof material is composed of the following components in weight parts: 10 parts of polyester (polyethylene terephthalate), 5 parts of ethylene-ethyl acrylate copolymer, 3 parts of microcrystalline calcium sulfate, 2 parts microcrystalline cellulose, 0.2 parts of hydroxyethylmethyl cellulose, 50 parts of ethanol, 29.8 parts of n-propanol, based on 100 parts weight.

The preparation method of the waterproof material is as follows: adding ethanol and n-propanol to a sandwich reactor, increasing the temperature to 90° C., starting the blender, adding polyester, then adding ethylene-ethyl acrylate copolymer and dissolving and polymerizing for 4 hours; then adding microcrystalline calcium sulfate and polymerizing for 2 hours; adding microcrystalline cellulose fibre and polymerizing for 2 hours; after adding hydroxyethylmethyl cellulose and agitating for 40 minutes, decreasing the temperature to 40° C., and stopping agitating and heating; placing the product to a storage tank and packaging barrel, thereby obtaining the finished product.

Example 2

An environmentally-friendly anti-cracking, anti-corrosive and waterproof material is composed of the following components in weight parts: 15 parts of poly(vinyl butyral), 5 parts of microcrystalline zinc sulfate, 3 parts of cellulose acetate butyrate, 0.1 parts of ethyl cellulose, 76.9 parts of methanol, based on 100 parts weight.

The preparation method of the waterproof material is as follows: adding methanol to a sandwich reactor and heating to 105° C., starting the blender, adding poly(vinyl butyral) and dissolving, then polymerizing for 5 hours; adding microcrystalline zinc sulfate, dissolving and polymerizing for 3 hours; after adding cellulose acetate butyrate and agitating 2 hours, adding ethyl cellulose and agitating for 30 minutes, then decreasing the temperature to 30° C., thereby obtaining the finished product.

Example 3

An environmentally-friendly anti-cracking, anti-corrosive and waterproof material is composed of the following components in weight parts: 13 parts of poly(vinyl butyral), 2 parts of phenolic resin polyethylene, 4 parts of lithium sulfate, 2 parts of zirconium sulfate, 3 parts of nitrocellulose, 0.15 parts of hydroxypropylmethyl cellulose, 75.85 parts of n-propanol, based on 100 parts weight.

The preparation method of the waterproof material is as follows: adding n-propanol to a sandwich reactor and heating to 95° C., starting the blender, adding poly(vinyl butyral) and phenolic resin polyethylene and dissolving, then polymerizing them for 3 hours; adding lithium sulfate and zirconium sulfate, and dissolving and polymerizing for 2 hours; after adding nitrocellulose and dissolving for 1 hours, adding hydroxypropylmethyl cellulose and agitating for 30 minutes, then decreasing the temperature to 30° C., thereby obtaining the finished product.

Example 4

An environmentally-friendly anti-cracking, anti-corrosive and waterproof material is composed of the following components in weight parts: 12 parts of polyisobutylene, 5 parts of magnesium sulfate, 2 parts of cellulose acetate, 0.16 parts of carboxymethyl cellulose, 80.84 parts of glycol, based on 100 parts weight.

The preparation method of the waterproof material is as follows: adding glycol to a sandwich reactor and heating to 100° C., starting the blender, adding polyisobutylene, then dissolving and polymerizing them for 2.8 hours; adding magnesium sulfate, and dissolving and polymerizing them for 2.3 hours; after adding cellulose acetate and agitating for 2 hours, adding carboxymethyl cellulose, agitating for 30 minutes, then decreasing the temperature to 30° C., thereby obtaining the finished product.

Example 5

An environmentally-friendly anti-cracking, anti-corrosive and waterproof material is composed of the following components in weight parts: 11 parts of polyfluoroethylene, 4 parts of silicon dioxide, 2 parts of nitrocellulose, 1 parts of cellulose acetate, 0.22 parts of carboxypropyl methyl cellulose, 81.78 parts of n-butanol.

The preparation method of the waterproof material is as follows: adding n-butanol to a sandwich reactor and heating to 100° C., starting the blender, adding polyfluoroethylene, then dissolving and polymerizing for 4 hours; adding silicon dioxide, and dissolving and polymerizing for 2.5 hours; after adding nitrocellulose and cellulose acetate and agitating for 1.5 hours, adding carboxypropyl methyl cellulose, agitating for 40 minutes, then decreasing the temperature to 30° C., thereby obtaining the finished product.

The property index of the product prepared from the example 1 in the present invention is as follows.

TABLE 1

The technical property index of the inventive anti-cracking, anti-corrosive and waterproof material

| Number | Test project | Property index | Standard |
|---|---|---|---|
| 1 | Appearance | Colorless, transparent, homogeneous liquid | |
| 2 | Solid content (%) | ≥15 | GB 1858, appendix |
| 3 | Organic volatile substance (g/L) | ≤50 | GB 18582 |
| 4 | Free formaldehyde (g/kg) | ≤0.01 | GB 8077 |
| 5 | Benzene content (%) | ≤0.01 | GB/T 18446 |
| 6 | Soluble heavy metal (mg/kg) | ≤0.5 | GB 18582 |
| 7 | Drying time of the coating (20° C.) h | ≤3.0 | JC/T 901 |
| 8 | Heat resistant property of forming film (70° C. ± 2.0° C.), 10 min | No discoloration | |
| 9 | Abrasion ratio (%) | ≥100 | |
| 10 | Compression strength ratio (%) | ≥100 | |
| 11 | Water-retaining property (mortar) | ≥50 | |
| 12 | Anti-corrosive property (acid, alkali, oil, alcohol) | No abnormal | GB 2420 |
| 13 | Permeability, water absorption ratio (%) | ≤20 | JC/T 902 |
| | The treatment of heat, low temperature, UV, acid and alkali | No water trace / No color difference | JC/T 902 / JC/T 902 |
| 14 | Waterproof (28d) | No abnormal | GB/T 1767 |
| 15 | Aging resistance (300h) | No change | GB/T 14522 |
| 16 | Weather resistance | ≤1.0 | |
| 17 | Stain resistance (%) | ≤10 | GB/T 15608 |

TABLE 2

The property comparison of the inventive product and the conventional anti-corrosive and waterproof materials

| Technical property | The inventive anti-cracking, anti-corrosive and waterproof material | Rigid anti-corrosive and waterproof material | Soft waterproof roll material | Waterproof material of organic coating |
|---|---|---|---|---|
| Workability | Very Convenient and rapidly | Convenient | Very complex | good |
| Labor cost, 100 m²/day | 0.1 | 1 | 6 | 2 |
| Security | Very safe | Safe | Toxic and polluted | polluted |
| Anti-permeability | Excellent | Good | None | None |
| Anti-corrosive property | Excellent | Excellent | None | None |
| Antifreeze property | Excellent | Excellent | None | None |
| Anti-abrasion resistance | Excellent | Excellent | None | None |
| Durable life | ≥50 years | ≥30 years | ≤5 years | ≤5 years |
| Anti-cracking | Excellent | Bad | Excellent | Good |
| Anti-aging property | Excellent | Excellent | Bad | Bad |
| The impact on the environment | Friendly | None | Polluted | polluted |
| Consumed resource | Very low | Medium | High | Medium |
| Cost fee (m²/yuan) | 20-30 | 10-20 | ≥30-60 | ≥20-40 |
| Overall evaluation ratio | Excellent | General | Bad | General |

TABLE 3

Energy and resource consumption of per 10000 m² for anti-corrosive and waterproof engineering of the inventive and the conventional products

| Item | The inventive product | Conventional rigid product | Soft roll product | Coating |
|---|---|---|---|---|
| Consumed material(kg) | 1000 | 5000 | 20000 | 2000 |
| Nonrenewable resource(kg) | / | 4500 | 20000 | 1000 |
| Consumed 'three wastes' resource (kg) | 150 | 500 | / | / |
| Consumed energy (electricity, coal, gas) yuan | 200 | 300 | 1000 | 500 |

From tables 1-3, it can be seen that the product prepared from the invention has excellent property, is more safety than the conventional product, has low cost and the best comprehensive property, is able to reasonably apply 'three wastes' resource, achieves recycle and does not use nonrenewable resource at the same time. In addition, the inventive product has very low environmental pollution.

It should be noted that the examples are merely applied to explain the invention, but not to limit it, although the invention is explained in more detail in reference to the examples. It should be understood to a person skilled in the art that the modification and equivalent replacement could be subject to the invention still, without departing from the spirit and scope of the invention, which should be contained in the scope of the claims in the present invention.

What is claimed is:

1. An environmentally-friendly anti-cracking, anti-corrosive and waterproof material, comprising components in weight parts of:

| synthetic polyester resin | 5-15 parts; |
| penetrant | 3-6 parts; |
| cellulose fibre | 1-3 parts; |
| cellulose ether | 0.1-0.3 parts; and |
| solvent | 75-85 parts; | wherein a sum of the above components is 100 parts.

2. The environmentally-friendly anti-cracking, anti-corrosive and waterproof material, as recited in claim 1, comprising components in weight parts of: 15 parts of the synthetic polyester resin, 3 parts of the penetrant, 2 parts of the cellulose fibre, 0.2 parts of the cellulose ether, and 79.8 parts of the solvent.

3. The environmentally-friendly anti-cracking, anti-corrosive and waterproof material, as recited in claim 1, comprising components in weight parts of: 15 parts of the synthetic polyester resin, 5 parts of the penetrant, 3 parts of the cellulose fibre, 0.1 parts of the cellulose ether, and 76.9 parts of the solvent.

4. The environmentally-friendly anti-cracking, anti-corrosive and waterproof material, as recited in claim 1, comprising components in weight parts of: 15 parts of the synthetic polyester resin, 6 parts of the penetrant, 3 parts of the cellulose fibre, 0.15 parts of the cellulose ether, and 75.85 parts of the solvent.

5. The environmentally-friendly anti-cracking, anti-corrosive and waterproof material, as recited in claim 1, wherein the penetrant is at least one member selected from a group consisting of calcium sulfate whisker, zinc sulfate, zirconium sulfate, lithium sulfate, magnesium sulfate, and silicon dioxide.

6. The environmentally-friendly anti-cracking, anti-corrosive and waterproof material, as recited in claim 2, wherein the penetrant is at least one member selected from a group consisting of calcium sulfate whisker, zinc sulfate, zirconium sulfate, lithium sulfate, magnesium sulfate, and silicon dioxide.

7. The environmentally-friendly anti-cracking, anti-corrosive and waterproof material, as recited in claim 3, wherein the penetrant is at least one member selected from a group consisting of calcium sulfate whisker, zinc sulfate, zirconium sulfate, lithium sulfate, magnesium sulfate, and silicon dioxide.

8. The environmentally-friendly anti-cracking, anti-corrosive and waterproof material, as recited in claim 4, wherein the penetrant is at least one member selected from a group consisting of calcium sulfate whisker, zinc sulfate, zirconium sulfate, lithium sulfate, magnesium sulfate, and silicon dioxide.

9. The environmentally-friendly anti-cracking, anti-corrosive and waterproof material, as recited in claim 1, wherein the cellulose fibre is at least one member selected from a group consisting of nitrocellulose, cellulose acetate, cellulose acetate butyrate, and microcrystalline cellulose.

10. The environmentally-friendly anti-cracking, anti-corrosive and waterproof material, as recited in claim 2, wherein the cellulose fibre is at least one member selected from a group consisting of nitrocellulose, cellulose acetate, cellulose acetate butyrate, and microcrystalline cellulose.

11. The environmentally-friendly anti-cracking, anti-corrosive and waterproof material, as recited in claim 3, wherein the cellulose fibre is at least one member selected from a group consisting of nitrocellulose, cellulose acetate, cellulose acetate butyrate, and microcrystalline cellulose.

12. The environmentally-friendly anti-cracking, anti-corrosive and waterproof material, as recited in claim 4, wherein the cellulose fibre is at least one member selected from a group consisting of nitrocellulose, cellulose acetate, cellulose acetate butyrate, and microcrystalline cellulose.

13. The environmentally-friendly anti-cracking, anti-corrosive and waterproof material, as recited in claim 1, wherein the cellulose ether is at least one member selected from a group consisting of hydroxypropyl methyl cellulose, hydroxyethyl methyl cellulose, ethyl cellulose, and carboxymethyl cellulose.

14. The environmentally-friendly anti-cracking, anti-corrosive and waterproof material, as recited in claim 2, wherein the cellulose ether is at least one member selected from a group consisting of hydroxypropyl methyl cellulose, hydroxyethyl methyl cellulose, ethyl cellulose, and carboxymethyl cellulose.

15. The environmentally-friendly anti-cracking, anti-corrosive and waterproof material, as recited in claim 3, wherein the cellulose ether is at least one member selected from a group consisting of hydroxypropyl methyl cellulose, hydroxyethyl methyl cellulose, ethyl cellulose, and carboxymethyl cellulose.

16. The environmentally-friendly anti-cracking, anti-corrosive and waterproof material, as recited in claim 1, wherein the solvent is at least one member selected from a group consisting of ethanol, methanol, n-propanol, n-butanol, isobutanol, and glycol.

17. The environmentally-friendly anti-cracking, anti-corrosive and waterproof material, as recited in claim 2, wherein the solvent is at least one member selected from a group consisting of ethanol, methanol, n-propanol, n-butanol, isobutanol, and glycol.

18. The environmentally-friendly anti-cracking, anti-corrosive and waterproof material, as recited in claim 3, wherein the solvent is at least one member selected from a group consisting of ethanol, methanol, n-propanol, n-butanol, isobutanol, and glycol.

19. An environmentally-friendly anti-cracking, anti-corrosive and waterproof material, comprising components in weight parts of:
  synthetic polyester resin 5-15 parts;
  penetrant 3-6 parts;
  cellulose fibre 1-3 parts;
  cellulose ether 0.1-0.3 parts;
  solvent 75-85 parts;
  wherein: a sum of the above components is 100 parts;
  the penetrant is at least one member selected from a group consisting of calcium sulfate whisker, zinc sulfate, zirconium sulfate, lithium sulfate, magnesium sulfate, and silicon dioxide;
  the cellulose fibre is at least one member selected from a group consisting of nitrocellulose, cellulose acetate, cellulose acetate butyrate, and microcrystalline cellulose;
  the cellulose ether is at least one member selected from a group consisting of hydroxypropyl methyl cellulose, hydroxyethyl methyl cellulose, ethyl cellulose, and carboxymethyl cellulose; and
  the solvent is at least one member selected from a group consisting of ethanol, methanol, n-propanol, n-butanol, isobutanol, and glycol.

* * * * *